UNITED STATES PATENT OFFICE.

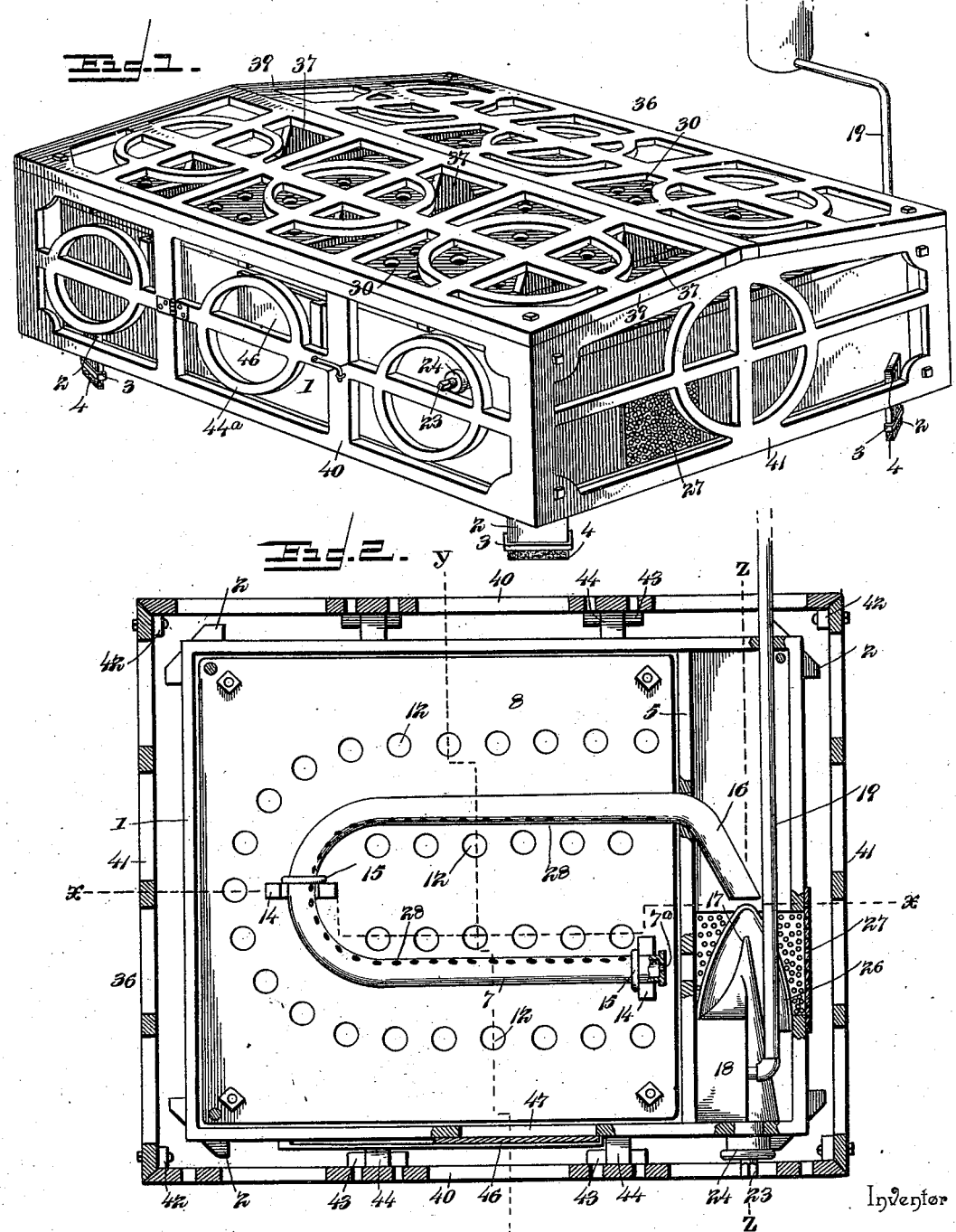

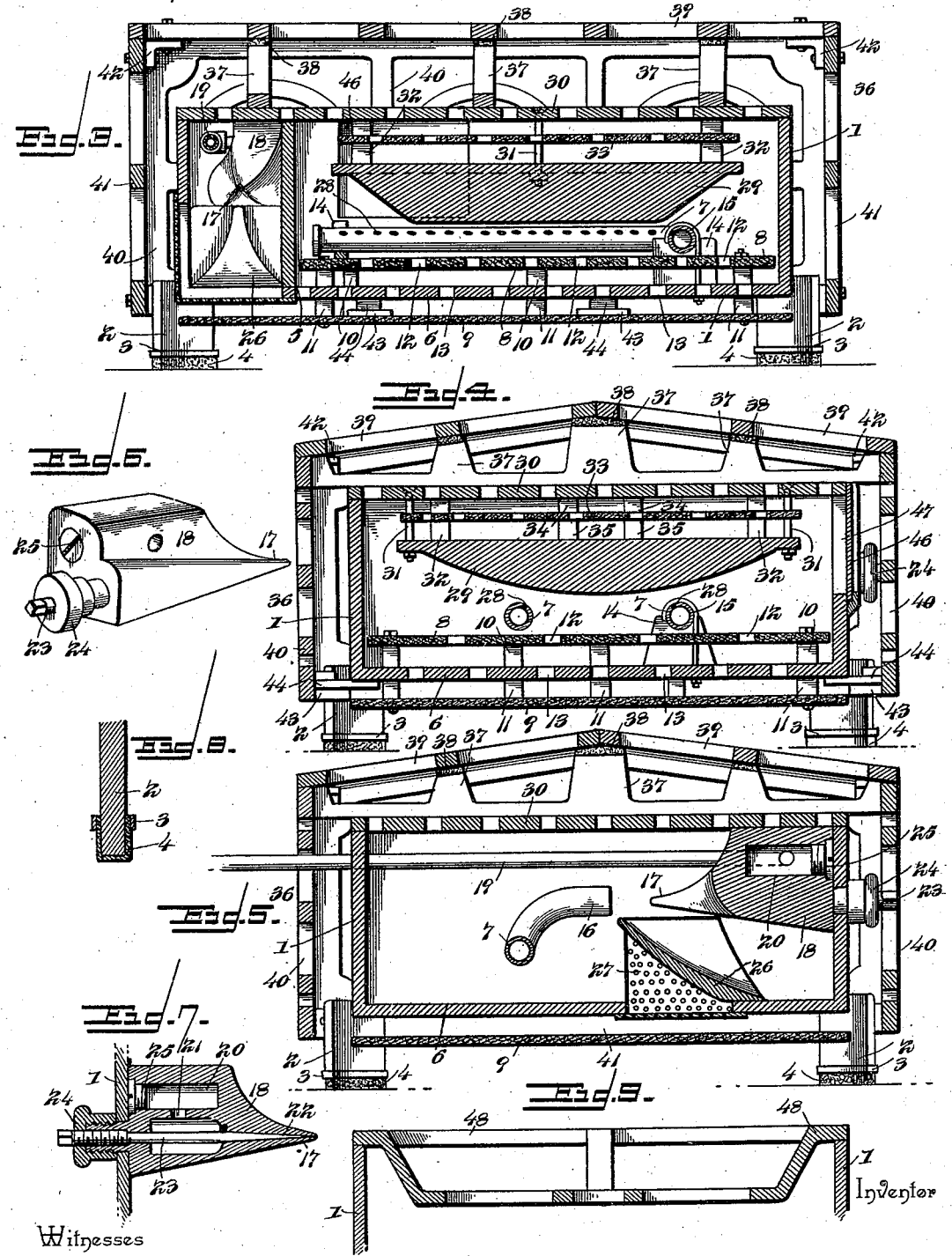

HARDIN MANN HUGHS, OF THREE MILE BAY, NEW YORK.

HEATER.

SPECIFICATION forming part of Letters Patent No. 574,684, dated January 5, 1897.

Application filed December 30, 1895. Serial No. 573,728. (No model.)

*To all whom it may concern:*

Be it known that I, HARDIN MANN HUGHS, a citizen of the United States, residing at Three Mile Bay, in the county of Jefferson and State of New York, have invented a new and useful Heater, of which the following is a specification.

The invention relates to improvements in heaters.
The object of the present invention is to improve the construction of heaters and to provide a simple and inexpensive one capable of use in a sleigh or other vehicle as a foot-warmer and adapted to be employed for heating rooms and the like.

A further object of the invention is to provide such a device which may, when desired, be readily converted into a cooking apparatus capable of use either indoors or out.
The invention consists in the construction and novel combination and arrangement of parts hereinafter fully described, illustrated in the accompanying drawings, and pointed out in the claims hereto appended.
In the drawings, Figure 1 is a perspective view of a heater constructed in accordance with this invention. Fig. 2 is a horizontal sectional view. Fig. 3 is a vertical sectional view on line $x$ $x$ of Fig. 2. Fig. 4 is a transverse sectional view on line $y$ $y$ of Fig. 2. Fig. 5 is a similar view on line $z$ $z$ of Fig. 2. Figs. 6 and 7 are detail views of the generator. Fig. 8 is a detail sectional view of one of the legs. Fig. 9 is a detail sectional view illustrating the manner of mounting the cooking-support on the casing.

Like numerals of reference designate corresponding parts in all the figures of the drawings.
1 designates an inner rectangular casing constructed of suitable metal and supported by legs 2, preferably disposed at the corners and provided with caps of asbestos or other suitable non-conducting material to prevent any liability of a carpet or the like being scorched or otherwise injured through the legs of the heater becoming too hot. The asbestos caps are retained on the legs by bands 4, arranged at the upper edges of the caps, and the casing is provided adjacent to one end with a transverse partition 5, and its bottom 6 is provided with perforations to permit the necessary draft for a burner 7, which is located within the casing 1.

Horizontal sheets or plates 8 and 9 are located above and below the bottom of the casing and are suitably spaced therefrom by vertically-disposed projections 10 and 11, which are preferably formed integral with the bottom of the casing, and which extend from the upper and lower faces of the bottom thereof. The plates or sheets 8 and 9 are secured by bolts or other suitable fastening devices, which pass through perforations of the bottom of the casing and through the adjacent lugs, which are preferably located at the corners thereof. The lower sheet or plate 9 is imperforate to cause the air for supporting combustion to enter the heater at the sides and ends, and the upper plate or sheet 8 is provided with perforations 12, which are disposed over the intervals between the perforations 13 of the bottom of the casing to prevent any direct radiation of the heat from the burner in order that the upward passage of air for supplying combustion will not be interrupted or disturbed.

The burner 7 is substantially U-shaped and is suitably supported by enlarged lugs or posts 14, preferably formed integral with the bottom of the casing and provided at their upper edges with curved notches to form seats for the burner, and the latter is secured on the enlarged lugs or posts by any suitable clips 15. One end of the burner is closed and the other end is provided with an extension 16, disposed at an angle to the adjacent side of the burner, passing through a perforation of the transverse partition 5, and arranged within the narrow compartment formed by the said partition 5 and the adjacent end of the casing.

The extension of the burner is open and is separated a suitable distance from the reduced end 17 of a generator 18, communicating by a pipe 19 with a suitable reservoir of gasolene or other hydrocarbon. The generator is provided at the terminus of the pipe 19 with a chamber 20, forming a receptacle for the gasolene, and communicating by a passage 21 with the discharge-opening 22. Within the discharge-opening is mounted an adjusting-screw 23, which forms a cock or cut-off to regulate the supply of gas to the burner.

The outer terminal of the screw 23 is squared for the reception of a key, and a suitable nut 24 is mounted on the generator and carries a packing surrounding the screw and preventing the escape of gas or gasolene. The nut 24 is mounted on a tubular extension of the generator. The tubular extension passes through a perforation of an adjacent wall of the casing 1, the body of the generator being arranged at the inner face of the wall and a nut at the outer face thereof, and the nut 24 operates as a clamp and engages the casing and holds the generator firmly in position. The supply-pipe 19 communicates with the chamber 20 at one side thereof, and the outer end of the chamber is closed by a screw-plug 25.

An evaporating-dish 26 is mounted in the end compartment of the casing at a point beneath the reduced end of the generator, and is adapted to receive a suitable quantity of the gasolene and enable the same to be ignited and to heat the generator preparatory to the generation of gas in a manner similar to gasolene-burners of the ordinary construction, as will be readily understood by those skilled in the art to which this invention appertains.

The extension 16 is located at one end of the burner, and the other end of the burner is provided with a jet-opening 7ª, disposed in the direction of the generator for supplying the necessary heat for the same.

The casing is provided adjacent to the evaporating-pan 26 with a foraminous portion 27, which, while affording a sufficient draft to support combustion in the evaporating-pan, will prevent any sudden draft or high wind from blowing the flame from the generator, and this will be found particularly advantageous when the heater is used in the open air.

The burner is provided at the inner faces of its sides with perforations 28 to cause the jets to extend inward at an angle and to impinge against a horizontally-disposed radiator 29, suspended within the casing 1 from a perforated top 30 thereof. The radiator 29 is suspended by bolts 31 or other suitable fastening devices, and it is spaced by depending projections 32, formed integral with the perforated top 30 of the casing 1. A horizontally-disposed sheet or plate 33, of asbestos, is secured by the fastening devices 31, and is spaced from the radiator and also from the perforated top 30 by lugs 34 and 35, formed integral with the radiator and the top 30 and located, respectively, below and above the sheet or plate 33. The asbestos sheet or plate 33 is perforated, and the perforations thereof are disposed alternately with relation to those of the top 30, to prevent any direct upward radiation of heat from the radiator 29 in event of the latter becoming excessively heated.

The top 30 of the casing 1 is detachable and is supported upon the upper edges of the sides and ends of the body of the casing 1, and it is provided with depending flanges engaging the body of the casing and preventing the top from shifting or slipping accidentally. The radiator, which is suspended from the top, may be constructed of any suitable material, but is preferably made of solid metal beveled on its lower face at the ends, and presenting a lower convex face.

The inner casing 1 is arranged within an open-work outer frame or casing 36, forming a foot-rest and supported by posts or lugs 37, formed integral with and extending upward from the perforated top 30 of the inner casing, asbestos being interposed between the posts or lugs 37 and the top of the foot-rest, as shown at 38. The foot-support is substantially rectangular in cross-section, and is composed of an oppositely-inclined top 39, and sides and ends 40 and 41, secured to the top and to each other, the parts being preferably provided at their meeting edges with lugs 42 for the reception of the fastening devices. The sides of the outer casing or foot-rest are provided with inwardly-extending projections or flanges 43, which engage under and interlock with corresponding projections 44 of the inner casing. The projections or flanges 44 space the sides of the outer casing or foot-rest, and the latter is also prevented from moving upward and is securely held in proper position. The top of the casing 36 is inclined, as shown, for the convenience of the user, and the outer casing or foot-rest is interlocked with the inner casing by loosening or partially removing one end of it sufficiently to allow the lugs or flanges 43 and 44 to pass each other. After these lugs, projections, or flanges 43 and 44 are interlocked the fastening devices are tightened and the engaging portions cannot become accidentally disengaged.

The outer casing or foot-rest is provided with a hinged door 44, and the inner casing is provided adjacent to the same with a sliding door 46, mounted in suitable ways and adapted to expose an opening 47 of the inner casing and provided with a suitable locking device. The opening 47 permits the operator to inspect the heating apparatus and to manipulate the same.

The device, besides being adapted for heating rooms and operating as a foot-warmer, is also capable of use for cooking, and when this is desired the outer casing or foot-rest and the perforated top 30, with its radiator, are removed and a support 48 is employed. The support 48 rests upon the upper edges of the inner casings similar to the perforated top 30, and it may be constructed in any suitable manner to adapt it for holding the vessels employed in cooking or heating.

It will be seen that the heater is simple and comparatively inexpensive in construction, that it is positive and reliable in operation, and that it is capable of use as a foot-warmer, for heating rooms, and for cooking.

Changes in the form, proportion, and minor details of construction may be resorted to without departing from the principle or sacrificing any of the advantages of the invention.

What I claim is—

1. A heater comprising an inner casing, having a perforated bottom, a burner arranged within the casing, non-heat-conducting plates mounted on the inner casing and disposed above and below the bottom thereof and located beneath the burner, a removable top supported on the inner casing, a radiator suspended from the removable top and carried by the same, and an outer casing surrounding the inner casing and forming a foot-rest, substantially as described.

2. A heater comprising an inner casing, having a perforated bottom, a burner arranged within the casing, a non-heat-conducting plate located beneath the burner and mounted on the casing and preventing a downward radiation of heat, a radiator suspended within the casing and located above the burner, and a foot-rest mounted on the inner casing, substantially as described.

3. A heater comprising an inner casing, provided with a perforated bottom, upper and lower non-heat-conducting plates mounted on the casing and spaced from the bottom thereof, the lower plate being imperforate, and the upper plate being provided with perforations located opposite the intervals of the perforations of the bottom of the casing, a burner mounted within the casing and located above the upper plate, and a radiator suspended within the casing and mounted above the burner, substantially as described.

4. A heater comprising an inner casing, a plate located at the bottom of the casing and constructed of non-heat-conducting material, a burner located above the plate, a perforated top mounted on the inner casing, a radiator suspended within the casing and located above the burner, and a non-heat-conducting plate interposed between the perforated top and the radiator and spaced from them, substantially as and for the purpose described.

5. In a heater, the combination of an inner casing, a burner arranged therein, a top detachably mounted on the inner casing, a radiator suspended within the casing and carried by the top, and an open-work outer casing supported upon the said top and forming a foot-rest, substantially as described.

6. In a heater, the combination of an inner casing, a burner arranged therein, a top detachably mounted on the casing and provided with upward-extending lugs or posts, a radiator suspended from and carried by the top, and an outer casing supported upon the posts or lugs, and interlocked with the inner casing, and being removable therefrom, substantially as described.

7. In a heater, the combination of an inner casing, a burner, a detachable top carrying a radiator and provided with upwardly-extending supports, lugs extending horizontally from the casing, and an outer open-work casing supported on the said top and forming a foot-rest and provided with lugs engaging under and interlocked with those of the inner casing, substantially as described.

8. The combination with a heater provided with depending legs, of caps covering the lower ends of the legs and constructed of material which is a non-conductor of heat to prevent a carpet or the like from being scorched or otherwise injured, and bands arranged at the upper edges of the caps and securing the same to the legs, substantially as described.

9. In a heater, the combination of an inner casing provided adjacent to one end with a transverse partition, a substantially U-shaped burner mounted within the casing and having at one end a jet-opening and provided at the other end with an extension 16 located in the space between the partition and the adjacent end of the casing, a generator detachably secured to one side of the casing, provided with a longitudinal bore and having a chamber 20 communicating with the bore and forming a receptacle for gasolene, said generator being provided with a reduced end located opposite the end of the extension 16, an adjusting-screw arranged in the bore of the generator and forming a cock or cut-off, and a tapering evaporating dish located below the generator and located adjacent to the extension 16 and to the jet-opening of the other end of the burner, substantially as described.

In testimony that I claim the foregoing as my own I have hereto affixed my signature in the presence of two witnesses.

HARDIN MANN HUGHS.

Witnesses:
   JOHN H. SIGGERS,
   HAROLD H. SIMMS.